United States Patent
Sakamoto et al.

(10) Patent No.: US 12,552,956 B2
(45) Date of Patent: Feb. 17, 2026

(54) PHOTOPOLYMERIZABLE TYPE DENTAL SURFACE COATING COMPOSITION

(71) Applicant: SHOFU INC., Kyoto (JP)

(72) Inventors: Shuji Sakamoto, Kyoto (JP); Jun Uchida, Kyoto (JP)

(73) Assignee: SHOFU INC., Kyoto (JP)

(*) Notice: Subject to any disclaimer, the term of this patent is extended or adjusted under 35 U.S.C. 154(b) by 0 days.

(21) Appl. No.: 17/032,246

(22) Filed: Sep. 25, 2020

(65) Prior Publication Data

US 2021/0214573 A1   Jul. 15, 2021

(30) Foreign Application Priority Data

Sep. 26, 2019 (JP) ................................ 2019-175369

(51) Int. Cl.
| | | |
|---|---|---|
| *C09D 133/08* | (2006.01) | |
| *C08K 5/07* | (2006.01) | |
| *C08K 5/17* | (2006.01) | |
| *C08K 5/53* | (2006.01) | |

(52) U.S. Cl.
CPC .............. *C09D 133/08* (2013.01); *C08K 5/07* (2013.01); *C08K 5/17* (2013.01); *C08K 5/53* (2013.01)

(58) Field of Classification Search
CPC ... C08K 5/17; C08K 5/18; C08K 5/07; C09D 133/08
See application file for complete search history.

(56) References Cited

U.S. PATENT DOCUMENTS

| 2005/0113480 A1* | 5/2005 | Usuki | A61K 6/20 523/116 |
|---|---|---|---|
| 2015/0094396 A1* | 4/2015 | Nakatsuka | A61K 6/70 523/116 |
| 2016/0235631 A1 | 8/2016 | Nojiri | |

FOREIGN PATENT DOCUMENTS

| JP | 63-183904 | 7/1988 |
|---|---|---|
| JP | 04-29910 | 1/1992 |
| JP | 09-324019 | 12/1997 |
| JP | 2005-154312 | 6/2005 |

OTHER PUBLICATIONS

Extended European Search Report issued Mar. 19, 2021, in corresponding European Patent Application No. 20198291.5.

* cited by examiner

*Primary Examiner* — Wenwen Cai
(74) *Attorney, Agent, or Firm* — Wenderoth, Lind & Ponack, L.L.P.

(57) ABSTRACT

To provide a photopolymerizable type dental surface coating material composition which may finish the applied part lubriciously in a short time by exhibiting excellent surface curability regardless of the type of light irradiator, may protect the restoration from abrasion and stain for a long time by exhibiting excellent adhesive property to various restorations including the dental glass ionomer cement for filling and the tooth substance, and may have excellent storage stability that can maintain properties and characteristics for a long time. The photopolymerizable type dental surface coating composition of the present disclosure comprises (a) polyfunctional polymerizable monomer,
(b) volatile monofunctional polymerizable monomer,
(c) acidic group-containing polymerizable monomer,
(d) α-diketone compound,
(e-1) aromatic tertiary amine as (e) amine compound, and
(e-2) aliphatic tertiary amine as (e) amine compound, wherein
the compounding ratio of the (e-1) and the (e-2) is within a range of 1.0:99.0 to 70.0:30.0 in terms of mass ratio.

8 Claims, No Drawings

PHOTOPOLYMERIZABLE TYPE DENTAL SURFACE COATING COMPOSITION

CROSS-REFERENCE TO RELATED APPLICATIONS

This application is based on and claims the benefit of priority from Japanese Patent Application Serial No. 2019-175369 (filed on Sep. 26, 2019), the contents of which are hereby incorporated by reference in their entirety.

BACKGROUND OF THE INVENTION

Field of the Invention

The present disclosure relates to a photopolymerizable type dental surface coating material for forming a resin coating layer on a surface of a restoration. More specifically the present disclosure relates to a photopolymerizable type dental surface coating material that can finish a surface of a restoration into a smooth surface and protect the restoration from abrasion and stain by forming the resin coating layer.

Description of the Related Art

Restorations used in an oral cavity include a filling and restoring material, a crown prosthesis device such as an inlay an onlay, a crown and a bridge, an artificial tooth, a denture base, and a temporary restoration material. For these restorations, ceramic materials, resin materials, organic-inorganic composite materials in which inorganic fillers and resin materials are combined, and the like are used.

It is desirable that these restorations have the surface exposed in the oral cavity is as glossy as possible. The reason is that the surface property of the restoration affects the aesthetic property the touch feeling by the tongue, the plaque adhesion, the wear of the antagonist tooth and the like. For this reason, the work of polishing the surface of the restoration is generally performed.

The restoration is generally polished in the order of rough polishing, medium polishing and finish polishing by using a plurality of polishing materials having different abrasive grain roughness. However, the polishing work performed in a plurality of steps in this way is extremely complicated, and it takes time to make the surface of the restoration a glossy surface.

On the other hand, a method of obtaining a glossy surface in a short time by applying a photopolymerizable dental surface coating material containing a polymerizable monomer as a main component after rough polishing the surface of the restoration, and irradiating with a light to form a thin resin coating layer is proposed.

For example, Patent Document 1 proposes a photopolymerizable type dental surface coating composition containing 4 or more functional dipentaerythritol acrylate-based polymerizable monomer, a volatile solvent, and a photopolymerization initiator as main components.

Patent Document 2 discloses a technique of reducing the yellowness of the resin coating layer caused from the photopolymerization initiator by using acylphosphine oxide as the photopolymerization initiator in a photopolymerizable type dental surface coating composition containing a polyfunctional acrylate cross-linking agent in which three or more hydroxyl groups in one molecule of pentaerythritol or dipentaerythritol are modified with an acrylic acid ester group, a volatile (meth)acrylate compound, and a photopolymerization initiator.

Patent Document 3 proposes a photopolymerizable type dental surface coating composition in which the wear resistance is improved by compounding in a (meth) acrylate-based polymerizable monomer, in a monodisperse state, the inorganic fine particles which has an average particle diameter of 1 to 100 nm and has a surface modified by an alkoxysilane having an unsaturated double bond. Further, this patent document discloses that the adhesive property to a glass ionomer cement for dental filling and a tooth substance is improved by including a (meth)acrylate-based polymerizable monomer having an acidic group into a (meth)acrylate-based polymerizable monomer.

RELEVANT REFERENCES

Patent Literature

[Patent document 1] Japanese Unexamined Patent Application Publication No. S63-183904
[Patent document 2] Japanese Unexamined Patent Application Publication No. H4-29910
[Patent document 3] Japanese Unexamined Patent Application Publication No. 2005-154312

SUMMARY OF THE INVENTION

Technical Problem

However, although the photopolymerizable type dental surface coating compositions of Patent Document 1 and Patent Document 2 have adhesive property to a resin-based material, since these compositions do not have adhesive property to the glass ionomer cement for dental filling not containing a resin component, the peeling of the resin coating layer has occurred in a short time when it was applied to such restorations. Further, since these compositions do not have adhesive property to the tooth substance, even when they are applied to the restoration material having adhesive property, when the resin coating layer was formed on the tooth substance beyond the interface between the restoration and the tooth substance, it acts a starting point to generate the peeling and the chipping.

The photopolymerizable type dental surface coating composition of the Patent Document 2 shows excellent surface curability and exhibits high glossiness and mechanical property in the case of irradiating light by using a dental light-curing unit using a halogen lamp as a light source (hereinafter, referred to as "halogen light-curing unit"). However, when light was irradiated by using a dental light-curing unit using an LED lamp as a light source which is often used in actual clinical practice (hereinafter referred to as LED light-curing unit), because the surface curability was insufficient and a large amount of unpolymerized polymerizable monomer remained on the surface, the glossiness and material strength of the cured body were significantly inferior.

Further, as a result of the studies by the present disclosure regarding the photopolymerizable type dental surface coating composition of Patent Document 3, it was found that when only aromatic tertiary amine is contained as a reducing agent of the photopolymerization initiator in the composition, gelation occurs during storage. Furthermore, it was found that when only the aliphatic tertiary amine is contained as a reducing agent of the photopolymerization initiator, the surface curability and the adhesive property to the glass ionomer cement for dental filling and the tooth substance were decreased over time.

As described above, the conventional photopolymerizable type dental surface coating composition has a problem in any one or more of surface curability, adhesive property and storage stability. Therefore, there has been a demand for a photopolymerizable type dental surface coating composition having well-balanced these characteristics.

Therefore, a problem of the present disclosure is to provide a photopolymerizable type dental surface coating material composition which may solve the above described problems in the prior art, may finish the applied part glossy in a short time by exhibiting excellent surface curability regardless of the type of light-curing unit, may protect the restoration from abrasion and stain for a long time by exhibiting excellent adhesive property to various restorations including the dental glass ionomer cement for filling and the tooth substance, and may have excellent storage stability that can maintain properties and characteristics for a long time.

Solution to Problem

As a result of intensive studies by the present disclosure to solve the above problems, it has been found that, in photopolymerizable type dental surface coating composition containing polymerizable monomer including polyfunctional polymerizable monomer, volatile monofunctional polymerizable monomer and acidic group-containing polymerizable monomer, α-diketone compound and amine compound, the composition prepared by simultaneously compounding an aromatic tertiary amine and an aliphatic tertiary amine as an amine compound and adjusting the compounding ratio of the aromatic tertiary amine and the aliphatic tertiary amine within a specific range may exhibit excellent surface curability regardless of the type of light-curing unit, may exhibit excellent adhesive property to various restorations including the dental glass ionomer cement for filling and the tooth substance by formed resin coating layer, and may stably exhibit properties without gelation even when stored for a long period of time. Further, it has been that in the above composition, by further compounding an acylphosphine oxide compound and/or a polyfunctional acrylate-based polymerizable monomer, the surface curability is further improved and glossy resin coating layer having a smaller surface unpolymerized layer is formed and the present disclosure has been completed.

The present disclosure provides a photopolymerizable type dental surface coating composition, comprising
 (a) polyfunctional polymerizable monomer,
 (b) volatile monofunctional polymerizable monomer,
 (c) acidic group-containing polymerizable monomer,
 (d) α-diketone compound,
 (e-1) aromatic tertiary amine as (e) amine compound, and
 (e-2) aliphatic tertiary amine as (e) amine compound,
 wherein
 the compounding ratio of the (e-1) and the (e-2) is within a range of 1.0:99.0 to 70.0:30.0 in terms of mass ratio.

It is preferable that the above described photopolymerizable type dental surface coating composition comprises
 (a) polyfunctional polymerizable monomer: 20 to 90 wt. %,
 (b) volatile monofunctional polymerizable monomer: 5 to 70 wt. %,
 (c) acidic group-containing polymerizable monomer: 0.1 to 10.0 wt. %,
 (d) α-diketone compound: 0.1 to 10.0 wt. %,
 (e-1) aromatic tertiary amine: 0.1 to 7.0 wt. %, and
 (e-2) aliphatic tertiary amine: 0.1 to 10.0 wt. %.

It is preferable that the above described photopolymerizable type dental surface coating composition further comprises (f) acylphosphine oxide compound.

It is preferable that in the above described photopolymerizable type dental surface coating composition, the (a) polyfunctional polymerizable monomer is a polyfunctional acrylate-based polymerizable monomer.

Advantageous Effects of Invention

The photopolymerizable type dental surface coating composition of the present disclosure may exhibit excellent surface curability regardless of the type of light-curing unit and may form glossy resin coating layer on a restoration in a short time. Further, the photopolymerizable type dental surface coating composition of the present disclosure may exhibit excellent adhesive property to a restoration not containing a resin component such as the dental glass ionomer cement for filling and to tooth substance in addition to a restoration consisting of resin-based material such as a dental composite resin and a hard resin for dental crown. Therefore, it is possible to reduce the risk of peeling and chipping and to protect a restoration from abrasion and stain for a long period of time in a wider range of clinical cases. Further, the photopolymerizable type dental surface coating composition of the present disclosure is excellent in storage stability, and it is possible to maintain characteristics and properties for a long period of time.

DETAILED DESCRIPTION OF THE PREFERRED EMBODIMENTS

Hereinafter, each component of a photopolymerizable type dental surface coating composition of the present disclosure will be described in detail below.

As the (a) polyfunctional polymerizable monomer which can be used for the photopolymerizable type dental surface coating composition of the present disclosure, any polyfunctional polymerizable monomer may be used without any limitations as long as it has two or more radical-polymerizable unsaturated groups in a molecule, such as an acryloyl group and/or a methacryloyl group. That is, examples thereof include a polyfunctional (meth)acrylate-based polymerizable monomer and a polyfunctional (meth)acrylamide-based polymerizable monomer. The polyfunctional polymerizable monomer having a (meth)acrylate group as a polymerizable unsaturated group is specifically described below as a representative example. Further, in the present disclosure, the term "(meth)acryloyl" inclusively refers to both of acryloyl and methacryloyl, and the term "(meth)acrylate" inclusively refers to both of acrylate and methacrylate.

Examples of the aromatic bifunctional polymerizable monomer include bisphenol A diglycidyl (meth)acrylate (Bis-GMA), 2,2-bis(4-(meth)acryloyloxy phenyl) propane, 2,2-bis(4-(meth)acryloyloxy ethoxyphenyl) propane, 2,2-bis (4-(meth)acryloyloxy diethoxyphenyl) propane, 2,2-bis(4-(meth)acryloyloxy tetraethoxyphenyl) propane, 2,2-bis(4-(meth)acryloyloxy pentaethoxyphenyl) propane, 2,2-bis(4-(meth)acryloyloxy dipropoxyphenyl) propane, 2(4-(meth)acryloyloxy ethoxyphenyl)-2(4-(meth)acryloyloxy diethoxyphenyl) propane, 2(4-(meth)acryloyloxy diethoxyphenyl)-2(4-(meth)acryloyloxy triethoxyphenyl) propane, 2(4-(meth)acryloyloxy dipropoxyphenyl)-2(4-(meth)acryloyloxy triethoxyphenyl) propane, 2,2-bis (4-(meth)acryloyloxy dipropoxyphenyl) propane, 2,2-bis(4-(meth)acryloyloxy isopropoxyphenyl) propane, 2,2-bis(4-(meth)

acryloyloxy polyethoxyphenyl) propane, 9,9-bis [4-(2-acryloyloxyethoxy) phenyl]fluorine and the like, but are not limited to.

Examples of the aliphatic bifunctional polymerizable monomer include ethyleneglycol di(meth)acrylate, diethyleneglycol di(meth)acrylate, triethyleneglycol di(meth)acrylate, tetraethyleneglycol di(meth)acrylate, polyethyleneglycol di(meth)acrylate, 2-hydroxypropyl-1,3-di(meth)acrylate (GDMA), 3-hydroxypropyl-1,2-di(meth)acrylate, 2-hydroxy-3-acryloyloxypropyl methacrylate (GDA), neopentylglycol di(meth)acrylate, propyleneglycol di(meth)acrylate, dipropylene glycol di(meth)acrylate, tripropylene glycol di(meth)acrylate, tricyclodecane dimethanol di(meth)acrylate, 1,3-butanediol di(meth)acrylate, 1,4-butanediol di(meth)acrylate, 1,6-hexanediol di(meth)acrylate, 1,9-nonanediol di(meth)acrylate, 1,10-decanediol di(meth)acrylate and the like, but are not limited to.

Examples of the tri functional polymerizable monomer include trimethylolpropane tri(meth)acrylate, trimethylolethane tri(meth)acrylate, trimethylolmethan tri(meth)acrylate, and pentaerythritol triacrylate, but are not limited to.

Examples of the tetra or more functional polymerizable monomer include pentaerythritol tetra(meth)acrylate, dipentaerythritol tetra(meth)acrylate, dipentaerythritol penta(meth)acrylate, dipentaerythritol hexa(meth)acrylate, and ditrimethylolpropane tetra(meth)acrylate, but are not limited to.

Examples of a urethane type polymerizable monomer include di(meth)acrylates having a bifunctional or tri or higher functional urethane bond, derived from an adduct of a hydroxyl group-containing polymerizable monomer such as 2-hydroxyethyl (meth)acrylate, 2-hydroxypropyl (meth)acrylate and 3-chloro-2-hydroxypropyl (meth)acrylate, and a diisocyanate compound such as methylcyclohexane diisocyanate, methylene bis (4-cyclohexylisocyanate), hexamethylene diisocyanate, trimethylhexamethylene diisocyanate, isophorone diisocyanate, diisocyanate methylbenzene or 4,4-diphenylmethane diisocyanate, but are not limited to.

These (a) polyfunctional polymerizable monomer may be used alone or as a mixture of two or more thereof. Among these, it is preferable to use a polyfunctional acrylate-based polymerizable monomer as the (a) polyfunctional polymerizable monomer. Further, it is preferable that the (a) polyfunctional polymerizable monomer does not contain an acidic group. Furthermore, the (a) polyfunctional polymerizable monomer can be the same as the (c) acidic group-containing polymerizable monomer, but is preferably different from the (c) acidic group-containing polymerizable monomer.

The content of the (a) polyfunctional polymerizable monomer in the photopolymerizable type dental surface coating composition is preferably within a range of 20.0 to 90.0 wt. %, more preferably within a range of 30.0 to 80.0 wt. %. When the content of the (a) polyfunctional polymerizable monomer is less than 20.0 wt. % or exceeds 90.0 wt. %, there is a case where the surface curability is lowered.

As the (b) volatile monofunctional polymerizable monomer which can be used for the photopolymerizable type dental surface coating composition of the present disclosure, any volatile monofunctional polymerizable monomer may be used without any limitations as long as it has a boiling point within a range of 50 to 120° C. under a normal pressure. Specific examples of the (b) volatile monofunctional polymerizable monomer include methyl (meth)acrylate, ethyl (meth)acrylate, and 2,2,2-trifluoroethyl (meth)acrylate, but are not limited to. These (b) volatile monofunctional polymerizable monomer may be used alone or as a mixture of two or more thereof.

The content of the (b) volatile monofunctional polymerizable monomer in the photopolymerizable type dental surface coating composition is preferably within a range of 5.0 to 70.0 wt. %, more preferably within a range of 10.0 to 60.0 wt. %. When the content of the (b) volatile monofunctional polymerizable monomer is less than 5.0 wt. % or exceeds 70.0 wt. %, there is a case where the surface curability is lowered. Further, it is preferable that the (b) volatile monofunctional polymerizable monomer does not contain an acidic group. Furthermore, the (b) volatile monofunctional polymerizable monomer can be the same as the (c) acidic group-containing polymerizable monomer, but is preferably different from the (c) acidic group-containing polymerizable monomer.

As the (c) acidic group-containing polymerizable monomer which can be used for the photopolymerizable type dental surface coating composition of the present disclosure, any acidic group-containing polymerizable monomer may be used without any limitations as long as it has one or more acidic group such as a phosphate group, a phosphonic acid group, a carboxyl group, and a sulfonic acid group, and one or more radical-polymerizable unsaturated groups such as a (meth)acryloyl group in one molecule. That is, examples thereof include acidic group-containing (meth)acrylate-based polymerizable monomer and acidic group-containing (meth)acrylamide-based polymerizable monomer. The acidic group-containing polymerizable monomer having a (meth)acrylate group as a polymerizable unsaturated group is specifically described below as a representative example.

Specific examples of polymerizable monomer which has a phosphate group are not limited to, but include (meth)acryloyloxymethyl dihydrogen phosphate, 2-(meth)acryloyloxyethyl dihydrogen phosphate, 3-(meth)acryloyloxypropyl dihydrogen phosphate, 4-(meth)acryloyloxybutyl dihydrogen phosphate, 5-(meth)acryloyloxypentyl dihydrogen phosphate, 6-(meth)acryloyloxyhexyl dihydrogen phosphate, 7-(meth)acryloyloxyheptyl dihydrogen phosphate, 8-(meth)acryloyloxyoctyl dihydrogen phosphate, 9-(meth)acryloyloxynonyl dihydrogen phosphate, 10-(meth)acryloyloxydecyl dihydrogen phosphate, 11-(meth)acryloyloxyundecyl dihydrogen phosphate, 12-(meth)acryloyloxydodecyl dihydrogen phosphate, 16-(meth)acryloyloxyhexadecyl dihydrogen phosphate, 20-(meth)acryloyloxyeicosyl dihydrogen phosphate, bis [2-(meth)acryloyloxyethyl]hydrogensphosphate, bis [3-(meth)acryloyloxypropyl]hydrogen phosphate, bis [4-(meth)acryloyloxybutyl]hydrogen phosphate, bis [6-(meta)acryloyloxyhexyl]hydrogen phosphate, bis [8-(meth)acryloyloxyoctyl]hydrogen phosphate, bis [9-(meth)acryloyloxynonyl]hydrogen phosphate, bis [10-(meth)acryloyloxydecyl]hydrogen phosphate, 1,3-di(meth)acryloyloxypropyl-2-dihydrogenphosphate, 2-(meth)acryloyloxyethylphenyl hydrogen phosphate, and 2-(meth)acryloyloxyethyl-2'-bromoethyl hydrogen phosphate.

Specific examples of a polymerizable monomer which has a phosphonyl group are not limited to, but include 5-(meth)acryloyloxy pentyl-3-phosphonopropionate, 6-(meth)acryloyloxy hexyl-3-phosphonopropionate, 10-(meth)acryloyloxy decyl-3-phosphonopropionate, 6-(meth)acryloyloxy hexyl-3-phosphonoacetate, 10-(meth)acryloyloxy decyl-3-phosphonoacetate, and (meth)acryloyloxyethl phenyphosphonoacetate.

Specific examples of a polymerizable monomer which has a carboxyl group are not limited to, but include (meth)acrylic acid, 2-chloro acrylic acid, 3-chloro (meth)acrylic acid, 2-cyano acrylic acid, aconitic acid, mesaconic acid, maleic acid, maleic anhydride, itaconic acid, itaconic anhydride, fumaric acid, glutaconic acid, citraconic acid, utraconic acid, 1,4-di(meth)acryloyloxyethyl pyromellitic acid, 6-(meth)acryloyloxy naphthalene-1,2,6-tricarboxylic acid, 1-buten-1,2,4-tricarboxylic acid, 3-buten-1,2,3-tricarboxylic acid, N-(meth)acryloyl-p-aminobenzoic acid, N-(meth)acryloyl-5-aminosalicylic acid, 4-(meth)acryloyloxyethyl trimellitic acid and anhydride thereof, 4-(meth)acryloyloxybutyl trimellitic acid and anhydride thereof, 2-(meth)acryloyloxy benzoic acid, 6-(meth)acryloyloxyethyl hydrogen succinate, 6-(meth)acryloyloxyethyl hydrogen maleate, 11-(meth)acryloyloxy-1,1-undecane dicarboxylic acid, p-vinylbenzoic acid, 4-(meth)acryloyloxyethoxy carbonylphthalic acid, 4-(meth)acryloyloxybutyloxy carbonylphthalic acid, 4-(meth)acryloyloxyhexyloxy carbonylphthalic acid, 4-(meth)acryloyloxyoctyloxy carbonylphthalic acid, 4-(meth)acryloyloxydecyloxy carbonylphthalic acid and anhydride thereof, 5-(meth)acryloylaminopentyl carboxylic acid, 6-(meth)acryloyloxy-1,1-hexane dicarboxylic acid, 8-(meth)acryloyloxy-1,1-octane dicarboxylic acid, 10-(meth)acryloyloxy-1,1-decane dicarboxylic acid, and 11-(meth)acryloyloxy-1,1-undecane dicarboxylic acid.

Specific examples of a polymerizable monomer which has a sulfonate group are not limited to, but include 2-(meth)acrylamido-2-methyl propanesulfonic acid, styrenesulfonic acid, 2-sulfoethyl (meth)acrylate, 4-(meth)acryloyloxy benzenesulfonic acid, and 3-(meth)acryloyloxy propanesulfonic acid.

These (c) acidic group-containing polymerizable monomer may be used alone or as a mixture of two or more thereof.

The content of the (c) acidic group-containing polymerizable monomer in the photopolymerizable type dental surface coating composition is preferably within a range of 0.1 to 10.0 wt. %, more preferably within a range of 1.0 to 7.0 wt. %. When the content of the (c) acidic group-containing polymerizable monomer is less than 0.1 wt. %, adhesive property to a dental glass ionomer cement for filling and a tooth substance around a restoration may be lowered. When the content of the (c) acidic group-containing polymerizable monomer exceeds 10.0 wt. %, there is a case where the surface curability is lowered, storage stability worsens and gelation occurs over time.

The (d) α-diketone compound which can be used for the photopolymerizable type dental surface coating composition of the present disclosure acts as a photosensitizer and any α-diketone compound may be used without any limitations as long as it is generally used in dental curable compositions. Specific examples of the α-diketone compound include benzil, camphorquinone, α-naphthyl, acetnaphthene, p,p'-dimethoxybenzyl, p,p'-dichlorobenzylacetyl, pentandione, 1,2-phenanthrenequinone, 1,4-phenanthrenequinone, 3,4-phenanthrenequinone, 9,10-phenanthrenequinone and naphthoquinone, but are not limited to. These α-diketone compounds may be used alone or as a mixture of two or more thereof. Among them, it is preferable that camphorquinone is used as the α-diketone compound. Among these, it is preferable to use camphorquinone as the (d) α-diketone compound.

The content of the (d) α-diketone compound in the photopolymerizable type dental surface coating composition is preferably within a range of 0.1 to 10.0 wt. %, more preferably within a range of 0.5 to 5.0 wt. %. When the content of the (d) α-diketone compound is less than 0.1 wt. %, there is a case where the surface curability is lowered. In addition, when the content of the (d) α-diketone compound exceeds 10.0 wt. %, there is a case where the cured body becomes remarkably yellow or brown, and the aesthetic property may be poor.

The (e) amine compound which can be used for the photopolymerizable type dental surface coating composition of the present disclosure acts as a photopolymerization accelerator and any amine compound may be used without any limitations as long as it is generally used in dental curable compositions. However, in the present disclosure, two kinds include (e-1) aromatic tertiary amine and (e-2) aliphatic tertiary amine must simultaneously be compounded. The (e) amine compound is specifically described below.

Specific examples of the (e-1) aromatic tertiary amine include N,N-dimethylaniline, N,N-diethylaniline, N,N-di-n-butylaniline, N,N-dibenzylaniline, p-N,N-dimethyl-toluidine, m-N,N-dimethyl-toluidine, p-N,N-diethyl-toluidine, p-bromo-N,N-dimethylaniline, m-chloro-N,N-dimethylaniline, p-dimethylamino benzaldehyde, p-dimethylamino acetophenone, p-dimethylamino benzoic acid, p-dimethylamino benzoic acid ethyl ester, p-dimethylamino benzoic acid amino ester, N,N-dimethylanthranic acid methyl ester, N,N-dihydroxy ethylaniline, p-N,N-dihydroxyethyl-toluidine, p-dimethylamino phenyl alcohol, p-dimethylaminostyrene, N,N-dimethyl-3,5-xylidine, 4-dimethylaminopyridine, N,N-dimethyl-α-naphthylamine and N,N-dimethyl-ß-naphthylamine, but are not limited to. These (e-1) aromatic tertiary amine may be used alone or as a mixture of two or more thereof. Among them, it is preferable that p-dimethylaminobenzoic acid ethyl ester is used as the (e-1) aromatic tertiary amine.

The content of the (e-1) aromatic tertiary amine in the photopolymerizable type dental surface coating composition is preferably within a range of 0.1 to 7.0 wt. %, more preferably within a range of 0.5 to 5.0 wt. %. When the content of the (e-1) aromatic tertiary amine is less than 0.1 wt. %, there is a case where the surface curability is lowered over time. In addition, when the content of the (e-1) aromatic tertiary amine exceeds 7.0 wt. %, there is a case where storage stability worsens and gelation occurs over time.

Specific examples of the (e-2) aliphatic tertiary amine include tributylamine, tripropylamine, triethylamine, N-methyl diethanolamine, N-ethyl diethanolamine, N-propyl diethanolamine, N-ethyl diallylamine, N-ethyl dibenzylamine, triethanolamine, tri (isopropanol) amine, tri (2-hydroxybutyl) amine, triallylamine, tribenzylamine, N,N-dimethyl hexylamine, N,N-dimethyl dodecylamine, N,N-dimethyl stearylamine, N,N-dimethyl aminoethyl methacrylate, N,N-diethyl aminoethyl methacrylate, N-[3-(dimethylamino) propyl]acrylamide, 2,2'-(n-butylimino) diethanol, but are not limited to. These (e-2) aliphatic tertiary amine may be used alone or as a mixture of two or more thereof. Among them, it is preferable that N,N-dimethyl aminoethyl methacrylate and N-[3-(dimethylamino) propyl]acrylamide are used as the (e-2) aliphatic tertiary amine.

The content of the (e-2) aliphatic tertiary amine in the photopolymerizable type dental surface coating composition is preferably within a range of 0.1 to 10.0 wt. %, more preferably within a range of 1.0 to 7.0 wt. %. When the content of the (e-2) aliphatic tertiary amine is less than 0.1 wt. %, there is a case where the surface curability is lowered, storage stability worsens and gelation occurs over time. In addition, when the content of the (e-2) aliphatic tertiary amine exceeds 10.0 wt. %, adhesive property to a dental glass ionomer cement for filling and a tooth substance around a restoration may be lowered.

In the present disclosure, the mass ratio of the (e-1) aromatic tertiary amine and the (e-2) aliphatic tertiary amine must be within a range of 1.0:99.0 to 70.0:30.0. Further, it is preferable that the mass ratio of the (e-1) aromatic tertiary amine and the (e-2) aliphatic tertiary amine is within a range of 10.0:90.0 to 50.0:50.0. In this ratio, when the compounding ratio of the (e-1) aromatic tertiary amine is smaller than 1.0:99.0, the storage stability worsens and the surface curability is lowered over time. Further, because the (e-2) aliphatic tertiary amine having a high compounding ratio forms a salt with the (c) acidic group-containing polymerizable monomer contained in the composition, adhesive property to a dental glass ionomer cement for filling or a tooth substance around a restoration is lowered. On the other hand, for this ratio, when the compounding ratio of the (e-1) aromatic tertiary amine is larger than 70.0:30.0, the surface curability is lowered. In addition, the storage stability worsens and the surface curability is lowered over time.

In the photopolymerizable type dental surface coating composition of the present disclosure, it is preferable to include (f) acylphosphine oxide compound because the surface curability is further improved. The (f) acylphosphine oxide compound acts as a photosensitizer and any acylphosphine oxide compound may be used without any limitations as long as it is generally used in dental curable compositions. Specific examples of the (f) acylphosphine oxide compound include 2,4,6-trimethylbenzoyl diphenylphosphine oxide, bis(2,6-dimethoxy benzoyl)-2,4,4-trimethyl pentylphosphine oxide, 2,6-dimethoxy benzoyl diphenylphosphine oxide and bis(2,6-dimethoxy benzoyl) phenylphosphine oxide, but are not limited to. These acylphosphine oxide compounds may be used alone or as a mixture of two or more thereof.

The content of the (f) acylphosphine oxide compound in the photopolymerizable type dental surface coating composition is preferably within a range of 0.1 to 10.0 wt. %.

The photopolymerizable dental surface coating material composition of the present disclosure, for the purpose of adjusting its properties, operability, or mechanical characteristics, may further contain a monofunctional polymerizable monomer having no volatility other than the above-described (b) volatile monofunctional polymerizable monomer. The monofunctional polymerizable monomer having no volatility in this case preferably does not contain an acidic group-containing polymerizable monomer.

Examples of such monofunctional polymerizable monomer include 2-hydroxyethyl (meth)acrylate, 2-hydroxypropyl (meth)acrylate, and 2,3-dihydroxypropyl (meth)acrylate, butyl (meth)acrylate, hexyl (meth)acrylate, glycidyl (meth)acrylate, lauryl (meth)acrylate, cyclohexyl (meth)acrylate, allyl (meth)acrylate, 2-ethoxyethyl (meth)acrylate, methoxypolyethyleneglycol (meth)acrylate, isopropyl (meth)acrylate, isobutyl (meth)acrylate, 2-ethylhexyl (meth)acrylate, tetrahydrofurfuryl (meth)acrylate, benzyl (meth)acrylate, isobornyl (meth)acrylate and the like, but are not limited to. These monofunctional polymerizable monomers may be used alone or as a mixture of two or more thereof.

The photopolymerizable dental surface coating material composition of the present disclosure may further contain a photosensitizer and/or a photopolymerization accelerator other than those the above-described.

Examples of the photosensitizer include benzoin alkyl ethers such as benzoin ethyl ether, thioxanthones such as thioxanthone, benzophenones such as benzophenone, α-aminoacetophenones such as 2-benzyl-dimethyl amino-1-(4-morpholino phenyl)-butanone-1, ketals such as benzyldimethylketal, coumarins such as 3-(4-methoxybenzoyl) cumarin and titanocenes such as bis(cyclopentadienyl)-bis [2,6-difluoro-3-(1-pyrrolyl) phenyl]-titanium, but are not limited to. These photosensitizer may be used alone or as a mixture of two or more thereof.

In addition, examples of the photopolymerization accelerator include amine compounds such as primary amines and secondary amines, barbituric acids such as 1,3,5-trimethyl barbituric acid, tin compounds such as dibutyltin dilaurate, aldehyde compounds such as lauryl aldehyde, sulfur-containing compounds such as dodecyl mercaptan, but are not limited to. These photopolymerization accelerator may be used alone or as a mixture of two or more thereof.

Further, the photopolymerizable type dental surface coating composition of the present disclosure, for the purpose of adjusting its properties or operability may contain a thickener in a range that various properties are not influenced. As the thickener which can be used for the photopolymerizable type dental surface coating composition of the present disclosure, any of an inorganic thickener and an organic thickener can be used.

Specific examples of an inorganic thickener include fumed silica, calcium carbonate, calcium silicate, magnesium silicate, and a clay mineral such as saponite, montmorillonite, beidellite, vermiculite, sauconite, stevensite, hectorite, smectite, nekutaito and sepiolite, but are not limited to.

Specific examples of an organic thickener include methyl cellulose, hydroxyethyl cellulose, hydroxymethyl cellulose, hydroxypropyl cellulose, carboxymethyl cellulose, sodium carboxymethyl cellulose, calcium carboxymethyl cellulose, carboxypolymethylene, sodium alginate, propylene glycol alginate ester, sodium polyacrylate, starch, starch sodium glycolate, starch phosphate ester, polyvinyl pyrrolidone, carboxyvinyl polymer, khaya gum, arabic gum, karaya gum, guar gum, but are not limited to. These thickeners may be used alone or as a mixture of two or more thereof.

The content of the thickener in the photopolymerizable type dental surface coating composition is preferably within a range of 0.001 to 10.0 wt. %.

Further, the photopolymerizable type dental surface coating composition of the present disclosure, for the purpose of adjusting its operability, mechanical property and curing property may contain a non acid-reactive powder in a range that various properties are not influenced.

As the non acid-reactive powder used in the photopolymerizable type dental surface coating composition of the present disclosure, any non-acid reactive powder can be used without any limitation as long as the non acid-reactive powder does not contain element which may react with an acid group of the (c) acid group-containing polymerizable monomer. Examples of the non-acid reactive powder include known dental fillers such as an inorganic filler, an organic filler and an organic-inorganic composite filler, and these can be used alone or in a combination of a few of them without any limitation. Among them, it is especially preferable that an inorganic filler is used. In addition, a shape of these non acid-reactive powder is not particularly limited, but arbitral particle shapes such as spherical, needle-like, plate-like, ground-like, and scaly-shapes and aggregate thereof may be used. An average particle diameter of the non acid-reactive powder is not particular limited, but is preferably within a range of 0.001 to 30 μm.

Specific examples of the inorganic filler include quartz, amorphous silica, ultrafine silica, various glasses which does not contain element which may react with an acidic group (including a glass by melting method, synthetic glass by sol-gel method, a glass produced by a vapor phase reaction, and the like), silicon nitride, silicon carbide, boron carbide and the like, but is not limited thereto.

The content of the non acid-reactive powder in the photopolymerizable type dental surface coating composition is preferably within a range of 0.001 to 30 mass.%.

Furthermore, the photopolymerizable type dental surface coating composition of the present disclosure may optionally contain the other conventionally known additives such as preservatives, antimicrobial materials, and coloring pigments.

EXAMPLES

The present disclosure is described in more detail and specifically with reference to Examples. However, the present disclosure is not limited to Examples.

The components (a) to (f) used for preparing the photopolymerizable type dental surface coating compositions of Examples and Comparative Examples, and their abbreviations are as follows.

[(a) Polyfunctional Polymerizable Monomer]
  PTA: pentaerythritol triacrylate
  UDMA: di (methacryloxyethyl)-2,2,4-trimethylhexane methylene diurethane
  DPH: dipentaerythritol hexaacrylate
[(b) Volatile Monofunctional Polymerizable Monomer]
  MMA: methyl methacrylate
  EMA: ethyl methacrylate
[(c) Acidic Group-Containing Polymerizable Monomer]
  MDP: 10-methacryloyloxydecyl dihydrogen phosphate
  6-MHPA: 6-methacryloxyhexyl-3-phosphonoacetate
[(d) α-Diketone Compound]
  CQ: dl-camphorquinone
[(e-1) Aromatic Tertiary Amine]
  DMBE: p-dimethylamino benzoic acid ethyl ester
[(e-2) Aliphatic Tertiary Amine]
  TEOA: triethanolamine
  DMEM: N,N-dimethylamino ethyl methacrylate
[(f) Acylphosphine Oxide Compound]
  APO: 2,4,6-trimethylbenzoyl-diphenylphosphine oxide The photopolymerizable type dental surface coating compositions of Examples 1 to 34 and Comparative Examples 1 to 8 were prepared by mixing each component in the ratios shown in Table 1 and Table 2.

TABLE 1

| | (a) polyfunctional polymerizable monomer | | | (b) volatile monofunctional polymerizable monomer | | (c) acidic group-containing polymerizable monomer | | (d) α-diketone compound | (e) amine compound | | | | (f) acylphosphine oxide compound |
| | | | | | | | | | (e-1) aromatic tertiary amine | (e-2) aliphatic tertiary amine | | | |
| | DHP | UDMA | PTA | MMA | EMA | MDP | 6-MHPA | CQ | DMBE | DMEM | TEOA | (e-1):(e-2) | APO |
|---|---|---|---|---|---|---|---|---|---|---|---|---|---|
| Example 1 | 70 | | | 20 | | 4 | | 1 | 1 | 4 | | 20.0:80.0 | |
| Example 2 | 74 | | | 15 | | | 4 | 1 | 0.5 | 3.5 | | 12.5:87.5 | 2 |
| Example 3 | 92 | | | 3 | | 1.5 | | 0.3 | 0.2 | 3 | | 6.3:93.8 | |
| Example 4 | 18 | | | 72 | | | 3 | 2 | 1 | | 4 | 20.0:80.0 | |
| Example 5 | | 70 | | 20 | | 4 | | 1 | 0.5 | 4.5 | | 10.0:90.0 | |
| Example 6 | | | 60 | 30 | | 4 | | 1 | 0.5 | 4.5 | | 10.0:90.0 | |
| Example 7 | | 67 | | 20 | | 4 | | 1 | 0.5 | 4.5 | | 10.0:90.0 | 3 |
| Example 8 | 70 | | | | 20 | 4 | | 1 | 1 | 4 | | 20.0:80.0 | |
| Example 9 | 74 | | | 20 | | 0.05 | | 0.95 | 2 | 3 | | 40.0:60.0 | |
| Example 10 | 60 | | | 20 | | | 12 | 2 | 1.5 | 4.5 | | 25.0:75.0 | |
| Example 11 | 50 | | | 44 | | | 0.95 | 0.05 | 2 | 3 | | 40.0:60.0 | |
| Example 12 | 50 | | | 32 | | | 2 | 11 | 2 | 3 | | 40.0:60.0 | |
| Example 13 | 60 | | | 25 | | | 4 | 1 | 0.1 | 9.9 | | 1.0:99.0 | |
| Example 14 | 60 | | | 30 | | 4 | | 1 | 3.5 | 1.5 | | 70.0:30.0 | |
| Example 15 | 90 | | | 5 | | 1.5 | | 0.3 | 0.2 | 3 | | 6.3:93.8 | |
| Example 16 | 20 | | | 70 | | | 3 | 2 | 1 | | 4 | 20.0:80.0 | |
| Example 17 | 80 | | | 10 | | | 3 | 1 | 0.5 | 3.5 | | 12.5:87.5 | 2 |
| Example 18 | 30 | | | 60 | | | 3 | 1 | 0.5 | 3.5 | | 12.5:87.5 | 2 |
| Example 19 | 74 | | | 20 | | 0.1 | | 0.9 | 2 | 3 | | 40.0:60.0 | |
| Example 20 | 62 | | | 20 | | | 10 | 2 | 1.5 | 4.5 | | 25.0:75.0 | |
| Example 21 | 76 | | | 16 | | | 1 | 1 | 0.5 | 3.5 | | 12.5:87.5 | 2 |
| Example 22 | 72 | | | 14 | | | 7 | 1 | 0.5 | 3.5 | | 12.5:87.5 | 2 |
| Example 23 | 50 | | | 44 | | | 0.9 | 0.1 | 2 | 3 | | 40.0:60.0 | |
| Example 24 | 50 | | | 38 | | | 2 | 10 | 2 | 3 | | 40.0:60.0 | |
| Example 25 | 74 | | | 15 | | | 4.5 | 0.5 | 0.5 | 3.5 | | 12.5:87.5 | 2 |
| Example 26 | 72 | | | 14 | | | 3 | 5 | 0.5 | 3.5 | | 12.5:87.5 | 2 |
| Example 27 | 92 | | | 3 | | 1.5 | | 0.3 | 0.05 | 3.15 | | 1.6:98.4 | |
| Example 28 | 69 | | | 14 | | 4 | | 1 | 5 | 5 | | 50.0:50.0 | 2 |
| Example 29 | 69 | | | 14 | | 4 | | 1 | 7 | 3 | | 70.0:30.0 | 2 |
| Example 30 | 76 | | | 16.8 | | 4 | | 1 | 0.1 | 0.1 | | 50.0:50.0 | 2 |
| Example 31 | 76 | | | 15 | | 4 | | 1 | 1 | 1 | | 50.0:50.0 | 2 |
| Example 32 | 72 | | | 14 | | | 3 | 1 | 1 | 7 | | 12.5:87.5 | 2 |
| Example 33 | 60 | | | 20 | | 4 | | 1 | 10 | 5 | | 66.7:33.3 | |
| Example 34 | 60 | | | 21 | | 4 | | 1 | 2 | 12 | | 14.3:85.7 | |

TABLE 2

| | (a) polyfunctional polymerizable monomer | | | (b) volatile monofunctional polymerizable monomer | | (c) acidic group-containing polymerizable monomer | | (d) α-diketone compound | (e) amine compound | | | | (f) acylphosphine oxide compound |
|---|---|---|---|---|---|---|---|---|---|---|---|---|---|
| | | | | | | | | | (e-1) aromatic tertiary amine | (e-2) aliphatic tertiary amine | | | |
| | DHP | UDMA | PTA | MMA | EMA | MDP | 6-MHPA | CQ | DMBE | DMEM | TEOA | (e-1):(e-2) | APO |
| Comparative Example 1 | 70 | | | 24 | | | | 1 | 1 | 4 | | 20.0:80.0 | |
| Comparative Example 2 | | | | 90 | 4 | | | 1 | 1 | 4 | | 20.0:80.0 | |
| Comparative Example 3 | | 90 | | | | 3.5 | | 1 | 0.5 | 5 | | 9.1:90.9 | |
| Comparative Example 4 | 70 | | | 20 | | 4 | | | 1 | 5 | | 16.7:83.3 | |
| Comparative Example 5 | 70 | | | 22 | | 3 | | 1 | | 4 | | 0.0:100.0 | |
| Comparative Example 6 | 70 | | | 22 | | 4 | | 1 | 3 | | | 100.0:0.0 | |
| Comparative Example 7 | 70 | | | 20 | | 4 | | 1 | 0.02 | 4.98 | | 0.4:99.6 | |
| Comparative Example 8 | 70 | | | 20 | | 4 | | 1 | 4 | 1 | | 80.0:20.0 | |

The surface curability, adhesive property and storage stability of these photopolymerizable type dental surface coating compositions (Examples 1 to 34 and Comparative Examples 1 to 8) were evaluated. Table 3 and Table 4 show the test results. The evaluation method is as shown below.

[Surface Curability]

Under the environment of 23° C. and 50% of humidity, a resin coating layer was formed by thinly applying each photopolymerizable type dental surface coating composition by using a brush on a disk-shaped cured body (φ15, thickness: 1.0 mm) of a commercially available dental glass ionomer cement for filling (glass ionomer FX ULTRA (shade: A2)/manufactured by SHOFU INC.) and irradiating light using a dental polymerization light irradiator. As the dental light-curing unit, two kinds include SHOFU Grip Light II using a halogen lamp as a light source and PEN Bright using an LED lamp as a light source (both manufactured by SHOFU INC.) were used. The light irradiation time was set to two conditions including 10 seconds or 20 seconds. The surface condition of the resin coating layer was confirmed visually and by instrument, and the surface curability was evaluated in the following five criteria. Further, the test was performed three times for each composition and light irradiation condition.

5: High glossiness was exhibited and no surface unpolymerized layer was observed.
4: Relatively high glossiness was exhibited and a surface unpolymerized layer was slightly observed.
3: Glossiness was exhibited and a surface unpolymerized layer was slightly observed.
2: Slightly inferior in glossiness and many surface unpolymerized layers were observed.
1: There was no glossiness and many surface unpolymerized layers were observed.

[Adhesive Property]

Under the environment of 23° C. and 50% of humidity, a resin coating layer was formed by thinly applying each photopolymerizable type dental surface coating composition by using a brush on a bovine tooth enamel whose surface was polished by #600 silicon carbide polishing paper and a disk-shaped cured body (φ15, thickness: 1.0 mm) of a commercially available dental glass ionomer cement for filling (glass ionomer FX ULTRA (shade: A2)/manufactured by SHOFU INC.) and irradiating light using PEN Bright using an LED lamp as a light source (manufactured by SHOFU INC.) for 20 seconds. After loading 5,000 times thermal cycles (5° C.<->60° C., immersion time at each temperature: 1 minute) on each test piece, the adhesion state of the resin coating layer to the adherend was confirmed visually and the adhesive property was evaluated in the following five criteria. Further, the test was performed 5 times for each composition and adherend.

5: No peeling was observed in all samples.
4: Peeling was observed in 1 out of the 5 samples.
3: Peeling was observed in 2 out of the 5 samples.
2: Peeling was observed in 3 or 4 out of the 5 samples.
1: Peeling was observed in all samples.

[Storage Stability]

Each photopolymerizable type dental surface coating composition was filled in a plastic bottle container, the cap was tightly closed, and then the container was leaved to stand under an environment of 50° C. for 3 months (hereinafter, referred to as a 50° C. storage product). After leaving the 50° C. storage product to stand under an environment of 23° C. for 24 hours, the surface curability was evaluated by the method described above. As the dental light-curing unit for, PEN Bright using an LED lamp as a light source was used, and the light irradiation time was set to 20 seconds. Further, the content of each 50° C. storage product was taken out from the container, and their properties were confirmed visually and by instrument. The properties were confirmed in 3 bottle containers for each composition, and evaluated in the following five criteria.

5: No gelation was observed in all the samples.
4: A slight increase in viscosity was observed in at least 1 out of the 3 samples.
3: A clear increase in viscosity was observed in at least 1 out of the 3 samples.
2: Partial curing was observed in at least 1 out of the 3 samples.
1: Complete curing was observed in at least 1 out of the 3 samples.
-: Evaluation was not possible because the sample was gelled.

[Aesthetic Property]

Under the environment of 23° C. and 50% of humidity a resin coating layer having thickness of 30 μm or 10 μm was formed by thinly applying each photopolymerizable type dental surface coating composition by using a brush on a disk-shaped cured body (φ15, thickness: 1.0 mm) of a commercially available dental glass ionomer cement for filling (glass ionomer FX ULTRA (shade: A2)/manufactured by SHOFU INC.) and irradiating light using a dental polymerization light irradiator. As the dental light-curing unit, PEN Bright using an LED lamp as a light source (manufactured by SHOFU INC.) were used. The light irradiation time was set to 10 seconds. The color tone of the prepared sample was visually compared with the color tone of the separately prepared disk-shaped test specimen without applying the hotopolymerizable type dental surface coating composition, and the aesthetic property was evaluated in the following five criteria.

5: No color difference was observed when the thickness of the resin coating layer was 30 μm.
4: A slight difference in color tone was observed when the thickness of the resin coating layer was 30 μm, but no difference in color tone was observed when the thickness was 10 μm.
3: A slight difference in color tone was observed when the thickness of the resin coating layer was 10 μm.
2: A color difference was observed when the thickness of the resin coating layer was 10 μm.
1: A clear color difference was observed when the thickness of the resin coating layer was 10 μm.

TABLE 3

| Item | Storage Stability Halogen lamp irradiator | | Storage Stability LED lamp irradiator | | Adhesive Property To enamel | Adhesive Property To glass ionomer cement | Surface curability (LED lamp irradiator, 20 seconds) | Gelation | Aesthetic Property |
|---|---|---|---|---|---|---|---|---|---|
| Conditions | 10 seconds | 20 seconds | 10 seconds | 20 seconds | | | | | |
| Example 1 | 4 | 5 | 4 | 5 | 5 | 5 | 5 | 5 | 5 |
| Example 2 | 5 | 5 | 5 | 5 | 5 | 5 | 5 | 5 | 5 |
| Example 3 | 4 | 4 | 4 | 4 | 5 | 5 | 4 | 5 | 5 |
| Example 4 | 4 | 4 | 4 | 4 | 5 | 5 | 4 | 5 | 5 |
| Example 5 | 4 | 4 | 4 | 4 | 5 | 5 | 4 | 5 | 5 |
| Example 6 | 4 | 5 | 4 | 5 | 5 | 5 | 5 | 5 | 5 |
| Example 7 | 5 | 5 | 5 | 5 | 5 | 5 | 5 | 5 | 5 |
| Example 8 | 4 | 4 | 4 | 4 | 5 | 5 | 4 | 5 | 5 |
| Example 9 | 4 | 4 | 4 | 4 | 4 | 4 | 4 | 5 | 5 |
| Example 10 | 4 | 4 | 4 | 4 | 5 | 5 | 4 | 4 | 5 |
| Example 11 | 4 | 4 | 4 | 4 | 4 | 4 | 4 | 5 | 5 |
| Example 12 | 4 | 4 | 5 | 5 | 5 | 5 | 5 | 5 | 3 |
| Example 13 | 4 | 4 | 4 | 5 | 4 | 4 | 4 | 4 | 5 |
| Example 14 | 4 | 4 | 4 | 4 | 5 | 5 | 4 | 4 | 5 |
| Example 15 | 4 | 5 | 4 | 4 | 5 | 5 | 4 | 5 | 5 |
| Example 16 | 4 | 5 | 4 | 4 | 5 | 5 | 4 | 5 | 5 |
| Example 17 | 5 | 5 | 5 | 5 | 5 | 5 | 5 | 5 | 5 |
| Example 18 | 5 | 5 | 5 | 5 | 5 | 5 | 5 | 5 | 5 |
| Example 19 | 4 | 4 | 4 | 4 | 4 | 5 | 4 | 5 | 5 |
| Example 20 | 4 | 5 | 4 | 5 | 5 | 5 | 5 | 5 | 5 |
| Example 21 | 5 | 5 | 5 | 5 | 5 | 5 | 5 | 5 | 5 |
| Example 22 | 5 | 5 | 5 | 5 | 5 | 5 | 5 | 5 | 5 |
| Example 23 | 4 | 5 | 4 | 5 | 4 | 4 | 5 | 5 | 5 |
| Example 24 | 4 | 4 | 5 | 5 | 5 | 5 | 5 | 5 | 4 |
| Example 25 | 5 | 5 | 5 | 5 | 5 | 5 | 5 | 5 | 5 |
| Example 26 | 5 | 5 | 5 | 5 | 5 | 5 | 5 | 5 | 4 |
| Example 27 | 4 | 4 | 4 | 4 | 5 | 5 | 3 | 5 | 5 |
| Example 28 | 5 | 5 | 5 | 5 | 5 | 5 | 5 | 4 | 5 |
| Example 29 | 5 | 5 | 4 | 4 | 5 | 5 | 4 | 4 | 5 |
| Example 30 | 5 | 5 | 3 | 4 | 5 | 5 | 3 | 4 | 5 |
| Example 31 | 5 | 5 | 5 | 5 | 5 | 5 | 5 | 5 | 5 |
| Example 32 | 5 | 5 | 5 | 5 | 5 | 5 | 5 | 5 | 5 |
| Example 33 | 4 | 5 | 4 | 5 | 5 | 5 | 5 | 3 | 5 |
| Example 34 | 4 | 5 | 4 | 5 | 3 | 4 | 5 | 5 | 5 |

TABLE 4

| Item | Storage Stability Halogen lamp irradiator | | Storage Stability LED lamp irradiator | | Adhesive Property To enamel | Adhesive Property To glass ionomer cement | Surface curability (LED lamp irradiator, 20 seconds) | Gelation | Aesthetic Property |
|---|---|---|---|---|---|---|---|---|---|
| Conditions | 10 seconds | 20 seconds | 10 seconds | 20 seconds | | | | | |
| Comparative Example 1 | 4 | 5 | 4 | 5 | 1 | 1 | 5 | 5 | 5 |
| Comparative Example 2 | 2 | 2 | 2 | 2 | 3 | 3 | 2 | 5 | 5 |
| Comparative Example 3 | 2 | 3 | 2 | 3 | 2 | 3 | 3 | 5 | 5 |
| Comparative Example 4 | 1 | 1 | 1 | 1 | 1 | 1 | 1 | 5 | 5 |
| Comparative Example 5 | 4 | 5 | 4 | 5 | 5 | 5 | 2 | 5 | 5 |
| Comparative Example 6 | 3 | 4 | 3 | 4 | 4 | 5 | — | 1 | 5 |

TABLE 4-continued

| Item | Storage Stability | | | | Adhesive Property To glass | | Storage Stability Surfece curability | | |
|---|---|---|---|---|---|---|---|---|---|
| | Halogen lamp irradiator | | LED lamp irradiator | | | ionomer | (LED lamp irradiator, | | Aesthetic |
| Conditions | 10 seconds | 20 seconds | 10 seconds | 20 seconds | To enamel | cement | 20 seconds) | Gelation | Property |
| Comparative Example 7 | 4 | 5 | 4 | 5 | 2 | 2 | 2 | 5 | 5 |
| Comparative Example 8 | 3 | 3 | 2 | 2 | 4 | 4 | 2 | 2 | 5 |

As shown in Table 3, the photopolymerizable type dental surface coating compositions of Examples 1 to 34 had excellent surface curability regardless of the type of light-curing unit, and also exhibited good adhesive property and storage stability. On the other hand, as shown in Table 4, the photopolymerizable type dental surface coating compositions of Comparative Examples 1 to 8 were inferior in any characteristics of surface curability, adhesive property and storage stability as compared with Examples 1 to 34.

With respect to the use of substantially any plural and/or singular terms herein, those having skill in the art can translate from the plural to the singular and/or from the singular to the plural as is appropriate to the context.

Although the description herein has been given with reference to the drawings and embodiments, it should be noted that those skilled in the art may make various changes and modifications on the basis of this disclosure without difficulty. Accordingly, any such changes and modifications are intended to be included in the scope of the embodiments.

INDUSTRIAL APPLICABILITY

The present disclosure may provide a photopolymerizable type dental surface coating material composition which may finish the applied part lubriciously in a short time by exhibiting excellent surface curability regardless of the type of light irradiator, may protect the restoration from abrasion and stain for a long time by exhibiting excellent adhesive property to various restorations including the glass ionomer cement for dental filling and the tooth substance, and may have excellent storage stability that can maintain properties and characteristics for a long time.

What is claimed:
1. A photopolymerizable type dental surface coating composition, comprising
(a) polyfunctional polymerizable monomer: 20 to 90 wt. %,
(b) volatile monofunctional polymerizable monomer: 5 to 70 wt. %,
(c) polymerizable monomer: 0.1 to 10.0 wt. %,
(d) α-diketone compound: 0.1 to 10.0 wt. %,
(e-1) aromatic tertiary amine as (e) amine compound: 0.1 to 7.0 wt. %, and
(e-2) aliphatic tertiary amine as (e) amine compound: 0.1 to 10.0 wt. %, wherein
the compounding ratio of the (e-1) and the (e-2) is within a range of 1.0:99.0 to 70.0:30.0 in terms of mass ratio,
the (a) polyfunctional polymerizable monomer is one or more selected from the group consisting of dipentaerythritol hexaacrylate, di (methacryloxyethyl)-2,2,4-trimethylhexane methylene diurethane, bisphenol A diglycidyl (meth)acrylate, 2,2-bis(4-methacryloyloxy phenyl) propane, 2,2-bis(4-acryloyloxy phenyl) propane, 2,2-bis(4-methacryloyloxy ethoxyphenyl) propane, 2,2-bis(4-acryloyloxy ethoxyphenyl) propane, 2,2-bis(4-methacryloyloxy diethoxyphenyl) propane, 2,2-bis(4-acryloyloxy diethoxyphenyl) propane, 2,2-bis(4-methacryloyloxy tetraethoxyphenyl) propane, 2,2-bis(4-acryloyloxy tetraethoxyphenyl) propane, 2,2-bis(4-methacryloyloxy pentaethoxyphenyl) propane, 2,2-bis(4-acryloyloxy pentaethoxyphenyl) propane, 2,2-bis (4-methacryloyloxy dipropoxyphenyl) propane, 2,2-bis(4-acryloyloxy dipropoxyphenyl) propane, 2(4-methacryloyloxy ethoxyphenyl)-2(4-methacryloyloxy diethoxyphenyl) propane, 2(4-methacryloyloxy ethoxyphenyl)-2(4-acryloyloxy diethoxyphenyl) propane, 2(4-acryloyloxy ethoxyphenyl)-2(4-methacryloyloxy diethoxyphenyl) propane, 2(4-acryloyloxy ethoxyphenyl)-2(4-acryloyloxy diethoxyphenyl) propane, 2(4-methacryloyloxy diethoxyphenyl)-2(4-methacryloyloxy triethoxyphenyl) propane, 2(4-methacryloyloxy diethoxyphenyl)-2(4-acryloyloxy triethoxyphenyl) propane, 2(4-acryloyloxy diethoxyphenyl)-2(4-methacryloyloxy triethoxyphenyl) propane, 2(4-acryloyloxy diethoxyphenyl)-2(4-acryloyloxy triethoxyphenyl) propane, 2(4-methacryloyloxy dipropoxyphenyl)-2(4-methacryloyloxy triethoxyphenyl) propane, 2(4-methacryloyloxy dipropoxyphenyl)-2(4-acryloyloxy triethoxyphenyl) propane, 2(4-acryloyloxy dipropoxyphenyl)-2(4-methacryloyloxy triethoxyphenyl) propane, 2(4-acryloyloxy dipropoxyphenyl)-2(4-acryloyloxy triethoxyphenyl) propane, 2,2-bis (4-methacryloyloxy isopropoxyphenyl) propane, 2,2-bis (4-acryloyloxy isopropoxyphenyl) propane, 2,2-bis(4-methacryloyloxy polyethoxyphenyl) propane, 2,2-bis(4-acryloyloxy polyethoxyphenyl) propane, 9,9-bis [4-(2-acryloyloxyethoxy) phenyl]fluorine, ethyleneglycol dimethacrylate, diethyleneglycol dimethacrylate, triethyleneglycol dimethacrylate, tetraethyleneglycol dimethacrylate, polyethyleneglycol dimethacrylate, 2-hydroxypropyl-1,3-dimethacrylate, 2-hydroxy-3-acryloyloxypropyl methacrylate, neopentylglycol dimethacrylate, propyleneglycol dimethacrylate, dipropylene glycol dimethacrylate, tripropylene glycol dimethacrylate, tricyclodecane dimethanol dimethacrylate, 1,3-butanediol dimethacrylate, 1,4-butanediol dimethacrylate, 1,6-hexanediol dimethacrylate, 1,9-nonanediol dimethacrylate, 1,10-decanediol dimethacrylate, trimethylolpropane trimethacrylate, trimethylolpropane triacrylate, trimethylolethane trimethacrylate, trimethylolethane triacrylate, trimethylolmethan trimethacrylate, trimethylolmethan triacrylate, pentaerythritol triacrylate, pentaerythritol tetramethacrylate, pentaerythritol tetraacrylate, dipentaerythritol tetramethacrylate, dipentaerythritol tetraacrylate, dipentaerythritol pentamethacrylate, dipentaerythritol pentaacrylate, dipentaerythritol hexamethacrylate, dipentaerythritol hexaacrylate, ditrimethylolpropane tetramethacrylate, ditrimethylolpropane tetraacrylate, adduct of 2-hydroxyethyl methacrylate and methylcyclohexane diisocyanate, adduct of 2-hydroxyethyl acrylate and methylcyclohexane diisocyanate, adduct of 2-hydroxypropyl methacrylate and methylcyclohexane diisocyanate, adduct of 2-hydroxypropyl acrylate and methylcyclohexane diisocyanate, adduct of 2-hydroxyethyl methacrylate and methylene bis(4-cyclohexylisocyanate), adduct of 2-hydroxyethyl acrylate and methylene bis(4-cyclohexylisocyanate), adduct of 2-hydroxypropyl methacrylate and methylene bis(4-cyclohexylisocyanate), adduct of 2-hydroxypropyl acrylate and methylene bis(4-cyclohexylisocyanate), adduct of 2-hydroxyethyl methacrylate and hexamethylene diisocyanate, adduct of 2-hydroxyethyl acrylate and hexamethylene diisocyanate, adduct of 2-hydroxypropyl methacrylate and hexamethylene diisocyanate, adduct of 2-hydroxypropyl acrylate and hexamethylene diisocyanate, adduct of 2-hydroxyethyl methacrylate and trimethylhexamethylene diisocyanate, adduct of 2-hydroxyethyl acrylate and trimethylhexamethylene diisocyanate, adduct of 2-hydroxypropyl methacrylate and trimethylhexamethylene diisocyanate, adduct of 2-hydroxypropyl acrylate and trimethylhexamethylene diisocyanate, adduct of 2-hydroxyethyl methacrylate and isophorone diisocyanate, adduct of 2-hydroxyethyl acrylate and isophorone diisocyanate, adduct of 2-hydroxypropyl methacrylate and isophorone diisocyanate, adduct of 2-hydroxypropyl acrylate and isophorone diisocyanate, adduct of 2-hydroxyethyl methacrylate and diisocyanate methylbenzene, adduct of 2-hydroxyethyl acrylate and diisocyanate methylbenzene, adduct of 2-hydroxypropyl methacrylate and diisocyanate methylbenzene, adduct of 2-hydroxypropyl acrylate and diisocyanate methylbenzene, adduct of 2-hydroxyethyl methacrylate and 4,4-diphenylmethane diisocyanate, adduct of 2-hydroxyethyl acrylate and 4,4-diphenylmethane diisocyanate, adduct of 2-hydroxypropyl methacrylate and 4,4-diphenylmethane diisocyanate, and adduct of 2-hydroxypropyl acrylate and 4,4-diphenylmethane diisocyanate, the (b) volatile monofunctional and polymizerable monomer is one or more selected from the group consisting of methyl (meth)acrylate, and ethyl (meth)acrylate, the (c) polymerizable monomer is one or more selected from the group consisting of 10-methacryloyloxydecyl dihydrogen phosphate, 2-methacryloyloxyethyl dihydrogen phosphate, bis [2-methacryloyloxyethyl]hydrogensphosphate, 1,3-dimethacryloyloxypropyl-2-dihydrogenphosphate, 2-methacryloyloxyethylphenyl hydrogen phosphate, 4-methacryloyloxyethyl trimellitic acid, 4-acryloyloxyethyl trimellitic acid, anhydride of 4-methacryloyloxyethyl trimellitic acid, and anhydride of 4-acryloyloxyethyl trimellitic acid, the (d) α-diketone compound is one or more selected from the group consisting of benzil, camphorquinone, α-naphthyl, acetnaphthene, p,p'-dimethoxybenzyl, p,p'-dichlorobenzylacetyl, pentandione, 1,2-phenanthrenequinone, 1,4-phenanthrenequinone, 3,4-phenanthrenequinone, 9,10-phenanthrenequinone and naphthoquinone, the (e-1) aromatic tertiary amine is one or more selected from the group consisting of N,N-dimethylaniline, N,N-diethylaniline, N,N-di-n-butylaniline, N,N-dibenzylaniline, p-N,N-dimethyl-toluidine, m-N,N-dimethyl-toluidine, p-N,N-diethyl-toluidine, p-bromo-N, N-dimethylaniline, m-chloro-N,N-dimethylaniline, p-dimethylamino benzaldehyde, p-dimethylamino acetophenone, p-dimethylamino benzoic acid, p-dimethylamino benzoic acid ethyl ester, p-dimethylamino benzoic acid amino ester, N,N-dimethylanthranic acid methyl ester, N,N-dihydroxy ethylaniline, p-N,N-dihydroxyethyl-toluidine, p-dimethylamino phenyl alcohol, p-dimethylaminostyrene, N,N-dimethyl-3,5-xylidine, 4-dimethylaminopyridine, N,N-dimethyl-α-naphthylamine and N,N-dimethyl-0-naphthylamine, and the (e-2) aliphatic tertiary amine is one or more selected from the group consisting of tributylamine, tripropylamine, triethylamine, N-methyl diethanolamine, N-ethyl diethanolamine, N-propyl diethanolamine, N-ethyl diallylamine, N-ethyl dibenzylamine, triethanolamine, tri (isopropanol) amine, tri (2-hydroxybutyl) amine, triallylamine, tribenzylamine, N,N-dimethyl hexylamine, N,N-dimethyl dodecylamine, N,N-dimethyl stearylamine, N,N-dimethyl aminoethyl methacrylate, N,N-diethyl aminoethyl methacrylate, N-[3-(dimethylamino) propyl]acrylamide and 2,2'-(n-butylimino) diethanol.

2. The photopolymerizable type dental surface coating composition of claim 1, further comprising (f) acylphosphine oxide compound.

3. The photopolymerizable type dental surface coating composition of claim 1, wherein the (b) volatile monofunctional polymerizable monomer has a boiling point within a range of 50 to 120° C. under a normal pressure.

4. The photopolymerizable type dental surface coating composition of claim 2, wherein the (b) volatile monofunctional polymerizable monomer has a boiling point within a range of 50 to 120° C. under a normal pressure.

5. The photopolymerizable type dental surface coating composition of claim 1, wherein the mass ratio of the (e-1) and the (e-2) is within a range of 10.0:90.0 to 50.0:50.0.

6. The photopolymerizable type dental surface coating composition of claim 2, wherein the mass ratio of the (e-1) and the (e-2) is within a range of 10.0:90.0 to 50.0:50.0.

7. The photopolymerizable type dental surface coating composition of claim 3, wherein the mass ratio of the (e-1) and the (e-2) is within a range of 10.0:90.0 to 50.0:50.0.

8. The photopolymerizable type dental surface coating composition of claim 4, wherein the mass ratio of the (e-1) and the (e-2) is within a range of 10.0:90.0 to 50.0:50.0.

* * * * *